United States Patent
Paskin et al.

(10) Patent No.: US 8,583,672 B1
(45) Date of Patent: Nov. 12, 2013

(54) DISPLAYING MULTIPLE SPELLING SUGGESTIONS

(75) Inventors: Mark A. Paskin, Belmont, CA (US); Kelly Poon, Mountain View, CA (US); Yew Jin Lim, Cupertino, CA (US); Jon M. Wiley, Mountain View, CA (US); Jonathan J. Effrat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/087,323

(22) Filed: Apr. 14, 2011

(51) Int. Cl.
*G06F 17/30* (2006.01)

(52) U.S. Cl.
USPC ............................................ 707/765

(58) Field of Classification Search
None
See application file for complete search history.

(56) References Cited

U.S. PATENT DOCUMENTS

| | | | |
|---|---|---|---|
| 2007/0050351 A1* | 3/2007 | Kasperski et al. | 707/4 |
| 2007/0088686 A1* | 4/2007 | Hurst-Hiller et al. | 707/4 |

\* cited by examiner

*Primary Examiner* — Hung Q Pham
(74) *Attorney, Agent, or Firm* — Fish & Richardson P.C.

(57) ABSTRACT

Methods, systems, and apparatus, including computer programs encoded on a computer storage medium, for presenting spelling suggestions. In one aspect, a method includes receiving first search results for a first search query and a plurality of spelling suggestions for a first term in the first search query, wherein the first search results are provided by a search engine as a response to the first search query; displaying the plurality of spelling suggestions and the first search results in a user interface; receiving a user input selecting one of the plurality of spelling suggestions; transmitting data identifying the selected spelling suggestion to request second search results for a second search query comprising the selected spelling suggestion from the search engine; and displaying the second search results in place of the first search results in the user interface.

38 Claims, 6 Drawing Sheets

DISPLAYING MULTIPLE SPELLING SUGGESTIONS

BACKGROUND

This specification relates to displaying spelling suggestions for queries submitted to Internet search engines.

Internet search engines aim to identify resources (e.g., web pages, images, text documents, multimedia content) that are relevant to a user's needs and to present information about the resources in a manner that is most useful to the user. Internet search engines return a set of search results in response to a user-submitted query. Occasionally, the terms of a user-submitted query may not align well with what the user has in mind, for example, if the user-submitted query includes one or more misspellings. Even if the search results returned are relevant objectively to the user-submitted query, the results may not be relevant to the user's actual subjective needs.

SUMMARY

In general, one innovative aspect of the subject matter described in this specification can be embodied in methods that include the actions of receiving a first search query from a user device; receiving first search results for the first search query and a plurality of spelling suggestions for a first term in the first search query, wherein the first search results are provided by a search engine as a response to the first search query; and generating, for transmission to the user device, a user interface document that, when rendered, presents a user interface that displays the plurality of spelling suggestions and the first search results, wherein the user interface document includes instructions that are operable to cause the user device to perform operations comprising: receiving a user input selecting one of the plurality of spelling suggestions; transmitting data identifying the selected spelling suggestion to request second search results for a second search query comprising the selected spelling suggestion from the search engine; and displaying the second search results in place of the first search results in the user interface.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. At least one of the plurality of spelling suggestions is an aggressive spelling suggestion for the first term, wherein a particular spelling suggestion is an aggressive spelling suggestion if the particular spelling suggestion does not share a common phonetic representation with the first term or if an edit distance between the first term and the particular spelling suggestion is greater than a specified threshold value. The specified threshold value is two operations. The operations further comprise modifying the displayed plurality of spelling suggestions to indicate that the selected spelling suggestion has been selected. Transmitting the user interface document to the user device. Receiving data identifying the selected spelling suggestion; and providing the second search results for the second search query comprising the selected spelling suggestion to the user device. The instructions are instructions in a client-side scripting language, Java instructions, or native user device instructions executable on a native user device platform. The operations further comprise displaying the selected spelling suggestion in an input field in the user interface.

Another innovative aspect of the subject matter described in this specification can be embodied in methods that include the actions of receiving a first search query from a user device; receiving first search results for the first search query and a plurality of spelling suggestions for a first term in the first search query, wherein the first search results are provided by a search engine as a response to the first search query; generating, for transmission to the user device, a first user interface document that, when rendered, presents a first user interface that displays the plurality of spelling suggestions and the first search results; receiving data identifying a selected spelling suggestion; and generating, for transmission to the user device, a second user interface document that, when rendered, presents a second user interface that displays second search results provided by the search engine for a second search query comprising the selected spelling suggestion in place of the first search results.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. At least one of the plurality of spelling suggestions is an aggressive spelling suggestion for the first term, wherein a particular spelling suggestion is an aggressive spelling suggestion if the particular spelling suggestion does not share a common phonetic representation with the first term or if an edit distance between the first term and the particular spelling suggestion is greater than a specified threshold value. The specified threshold value is two operations. The second user interface, when rendered, modifies the appearance of the displayed plurality of spelling suggestions to indicate that the selected spelling suggestion has been selected. The second user interface further displays the selected spelling suggestion in an input field.

Another innovative aspect of the subject matter described in this specification can be embodied in methods that include the actions of generating, for transmission to a user device, a user interface document that, when rendered, presents a user interface that includes an input field, wherein the user interface document includes instructions that are operable to cause the user device to perform operations comprising: detecting a first search query entered in the input field by a user; before the first search query is explicitly submitted by the user, obtaining first search results for the first search query and a plurality of spelling suggestions for a first term in the first search query, wherein the first search results are provided by a search engine as a response to the first search query; and displaying the first search results and the plurality of spelling suggestions in the user interface.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. At least one of the plurality of spelling suggestions is an aggressive spelling suggestion for the first term, wherein a particular spelling suggestion is an aggressive spelling suggestion if the particular spelling suggestion does not share a common phonetic representation with the first term or if an edit distance between the first term and the spelling suggestion is greater than a specified threshold value. The specified threshold value is two operations.

Transmitting the user interface document to the user device. The operations further comprising receiving a user input selecting one of the plurality of spelling suggestions; transmitting data identifying the selected spelling suggestion to request second search results for a second search query comprising the selected spelling suggestion from the search engine; and displaying the second search results in place of the first search results in the user interface. Receiving data identifying a selected spelling suggestion and providing the second search results for the second search query comprising the selected spelling suggestion to the user device. The operations further comprising displaying the selected spelling suggestion in place of the first search query in the input field.

Another innovative aspect of the subject matter described in this specification can be embodied in methods that include the actions of receiving first search results for a first search query and a plurality of spelling suggestions for a first term in the first search query, wherein the first search results are provided by a search engine as a response to the first search query; displaying the plurality of spelling suggestions and the first search results in a user interface; receiving a user input selecting one of the plurality of spelling suggestions; transmitting data identifying the selected spelling suggestion to request second search results for a second search query comprising the selected spelling suggestion from the search engine; and displaying the second search results in place of the first search results in the user interface.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. At least one of the plurality of spelling suggestions is an aggressive spelling suggestion for the first term, wherein a particular spelling suggestion is an aggressive spelling suggestion if the particular spelling suggestion does not share a common phonetic representation with the first term or if an edit distance between the first term and the particular spelling suggestion is greater than a specified threshold value. The specified threshold value is two operations. Modifying the displayed plurality of spelling suggestions to indicate that the selected spelling suggestion has been selected. Displaying the selected spelling suggestion in an input field in the user interface.

Another innovative aspect of the subject matter described in this specification can be embodied in methods that include the actions of presenting a user interface that includes an input field; detecting a first search query entered in the input field by a user; before the first search query is explicitly submitted by the user, obtaining first search results for the first search query and a plurality of spelling suggestions for a first term in the first search query, wherein the first search results are provided by a search engine as a response to the first search query; and displaying the first search results and the plurality of spelling suggestions in the user interface.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions.

One or more computer programs can be configured to perform particular actions by virtue of including instructions that, when executed by data processing apparatus, cause the apparatus to perform the actions.

These and other embodiments can each optionally include one or more of the following features. At least one of the plurality of spelling suggestions is an aggressive spelling suggestion for the first term, wherein a particular spelling suggestion is an aggressive spelling suggestion if the particular spelling suggestion does not share a common phonetic representation with the first term or if an edit distance between the first term and the particular spelling suggestion is greater than a specified threshold value. The specified threshold value is two operations.

Receiving a user input selecting one of the plurality of spelling suggestions; transmitting data identifying the selected spelling suggestion to request second search results for a second search query comprising the selected spelling suggestion from the search engine; and displaying the second search results in place of the first search results in the user interface. Displaying the selected spelling suggestion in place of the first search query in the input field.

Particular embodiments of the subject matter described in this specification can be implemented so as to realize one or more of the following advantages. Users can view multiple spelling suggestions for a misspelled query. Additionally, users can easily view search results responsive to each of multiple displayed spelling suggestions. Furthermore, users can easily navigate between viewing search results responsive to a particular spelling suggestion and viewing search results for the originally-submitted query. Users can also learn the correct spelling of an ambiguous misspelling by examining the search results for multiple possible corrections.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
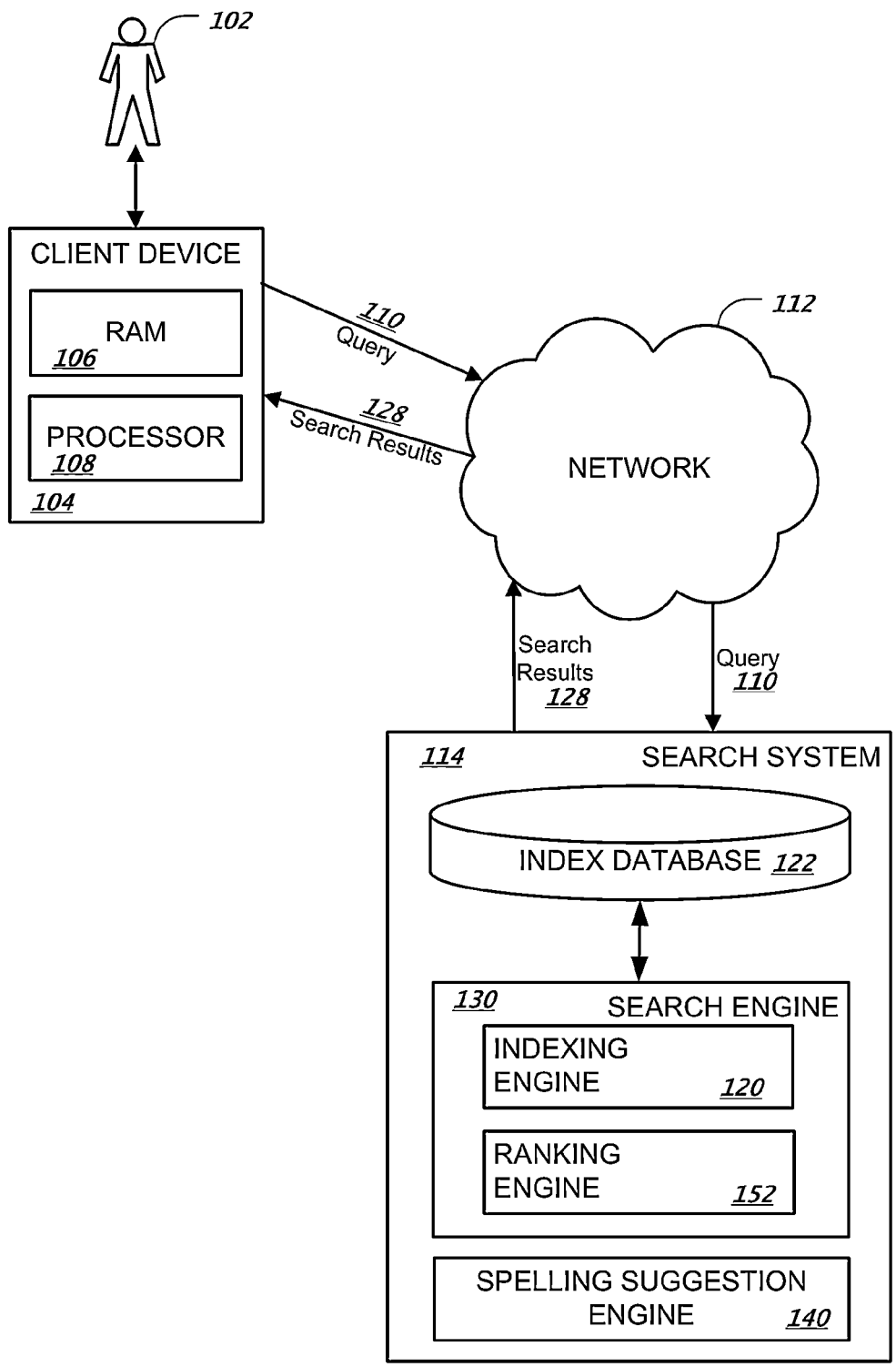
FIG. 1 shows an example search system.

FIG. 1 shows an example search system 114. The search system 114 is an example of an information retrieval system implemented on one or more computers in one or more locations, in which the systems, components, and techniques described below can be implemented.

A user 102 can interact with the search system 114 through a user device 104. For example, the user device 104 can be a computer coupled to the search system 114 through a local area network (LAN) or wide area network (WAN), e.g., the Internet. In some implementations, the search system 114 and the user device 104 can be one machine. For example, a user can install an application that facilitates searches on the user device 104. The user device 104 will generally include a random access memory (RAM) 106 and a processor 108.

A user 102 can submit a query 110 to a search system 114. A search engine 130 within the search system 114 performs the search to identify resources matching the query. When the user 102 submits a query 110, the query 110 may be transmitted through a network 112 to the search system 114. The search system 114 can be implemented as, for example, computer programs installed on one or more computers in one or more locations that are coupled to each other through a network. The search system 114 includes an index database 122 and the search engine 130. The search system 114 responds to the query 110 by generating search results 128, which are transmitted through the network to the user device 104 for presentation to the user 102, e.g., as a search results web page to be displayed in a web browser running on the user device 104.

When the query 110 is received by the search engine 130, the search engine 130 identifies resources that match the query 110. The search engine 130 will generally include an indexing engine 120 that indexes resources, e.g., web pages, images, or news articles on the Internet, an index database 122 that stores the index information, and a ranking engine 152 or other software that ranks the resources that match the query 110. The indexing and ranking of the resources can be performed using conventional techniques. The search engine 130 can transmit the search results 128 through the network to the user device 104 for presentation to the user 102.

The search system 114 also includes or can communicate with a spelling suggestion engine 140 that can generate multiple spelling suggestions, i.e., multiple correctly-spelled words that the user may have been attempting to spell, for each of one or more terms in the query 110. The generated spelling suggestions are then transmitted with the search results 128 to the user device 104 for presentation to the user 102. When the user device 104 receives a user input selecting one of the spelling suggestions, the user device can transmit data identifying the selected suggestion to the search system to obtain search results for a query that includes the spelling suggestion from search engine 130 and present the search results to the user 102.

The spelling suggestion engine 140 can be triggered to generate spelling suggestions when certain criteria are met, e.g., when the number or quality or both of search results included in the search results 128 is below a threshold value or when an estimate generated by a probabilistic language model of a likelihood that the user 102 intended to type the query 110 is below a different threshold value. In some implementations, once the spelling suggestions have been generated by the spelling suggestion engine 140, the search system 114 determines whether the difference between the number or quality or both of search results for queries including the generated spelling suggestions and the search results 128 exceeds a threshold value. If the difference exceeds the threshold value, the search system 110 transmits the spelling suggestions with the search results 128 to the user device. If the difference does not exceed the threshold value, the search system 110 discards the generated spelling suggestions.

In some circumstances, the spelling suggestions generated by the spelling suggestion engine 140 for a particular search query can include at least one aggressive spelling suggestion. A spelling suggestion for a particular term in the query is an aggressive spelling suggestion if it is sufficiently different from the particular term. That is, a spelling suggestion can be an aggressive spelling suggestion if the suggestion and the original term do not share a common phonetic representation in, for example, an alphabetic system of phonetic notation, e.g. the International Phonetic Alphabet (IPA).

Alternatively, a spelling suggestion can be an aggressive spelling suggestion if the edit distance, e.g., a Damerau-Levenshtein distance, between the spelling suggestion and the particular query term is greater than a specified threshold value. The edit distance is defined by the minimum number of operations, e.g., inserting, removing, or substituting a character or transposing two adjacent characters, required to transform the spelling suggestion into the particular query term. For example, a spelling suggestion can be considered aggressive if it takes more than two operations to transform the correction into the query term. For instance, in order to transform the word "ammunition" into an example received query "amoniction," a minimum of three operations are required. One such set of operations is as follows: an "m" is removed to generate "amunition," an "o" is substituted for the "u" to generate "amonition," and a "c" is inserted to generate "amoniction."

A spelling suggestion for a query term can also be considered an aggressive spelling suggestion if the edit distance is greater than a specified proportion of the length of the query term and of the suggestion. For example, the spelling suggestion can be an aggressive spelling suggestion if the edit distance between the suggestion and the query term is more than one-third of the number of characters in each of the query term and the suggestion.

A query that includes a badly misspelled word may trigger the spelling suggestion engine 140 to generate aggressive spelling suggestions for the query. In the case of a badly misspelled word, the user intent may be highly uncertain, e.g., it would be reasonable to conclude that the user was attempting to spell any one of two or more distinct words. In one example, when the received user query is "amoniction," the user may have been attempting to type any one of the words "ammunition," "admonition," or even "ammonization." Thus, these aggressive spelling suggestions may be included in the spelling suggestions provided by the spelling suggestion engine 140 in response to receiving a query "amoniction."

Figure 2:
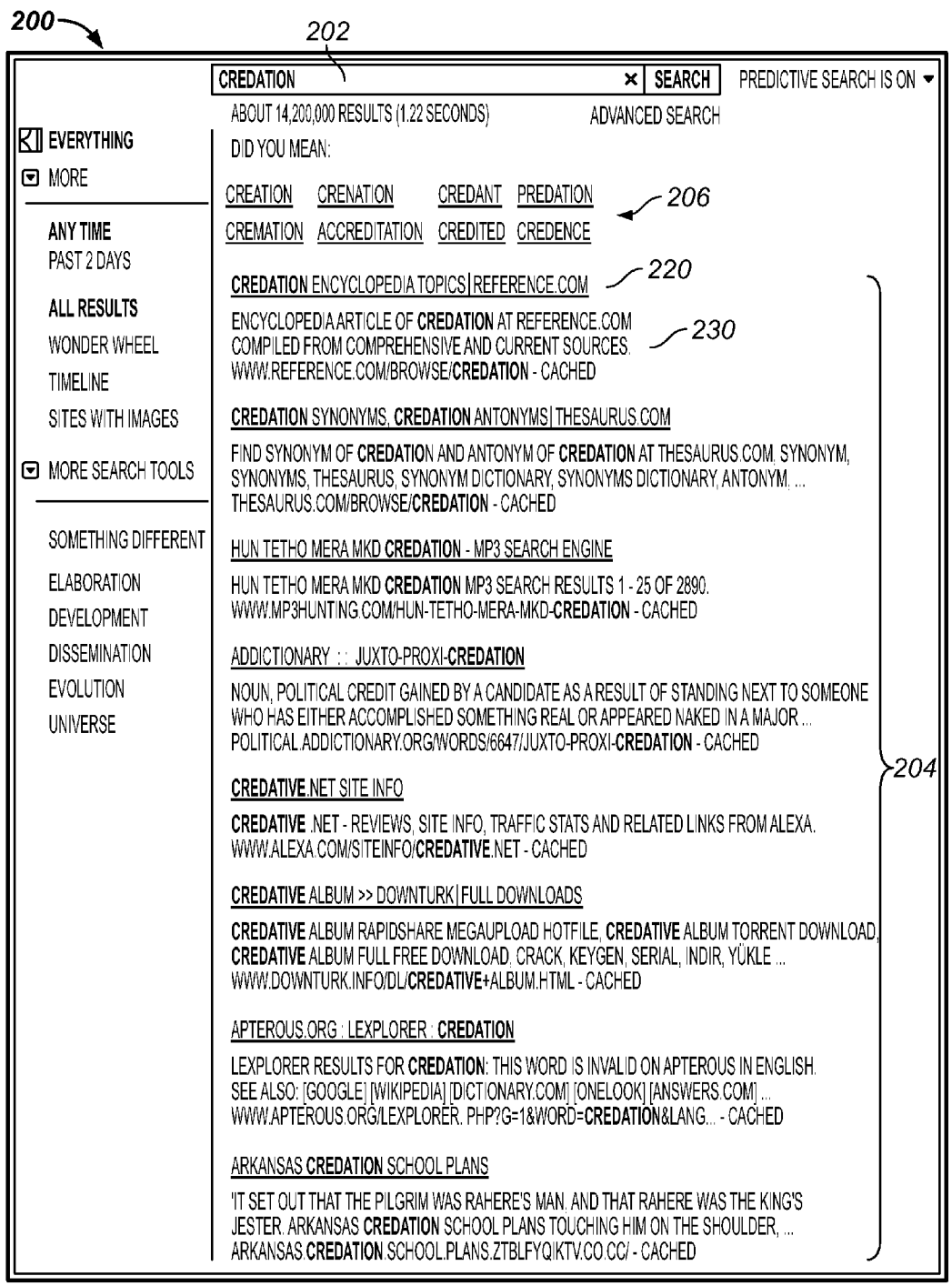
FIG. 2 illustrates an example user interface that includes search results and spelling suggestions.

FIG. 2 illustrates an example user interface 200 that includes search results 204 and spelling suggestions 206. The user interface can be presented to a user by a user device, e.g., a personal computer or a smart phone. The user interface can be implemented as a markup language document, e.g., an HTML (Hypertext Markup Language) or XML (Extensible Markup Language) document, and can have been sent to the user device by a search system, e.g., the search system 114 of FIG. 1.

The user interface 200 includes the original query 202, "credation" in this example, and a set of search results 204 returned from a search engine, e.g., search engine 130 of FIG. 1, in response to the original query 202. A search result referencing a particular resource can include a selectable link to the resource 220 and a snippet 230 of content about the resource.

The user interface 200 also includes spelling suggestions 206 based on the original query 202 displayed in a "Did you mean" portion of the user interface 200. A selectable control, e.g., a link, is displayed for each spelling suggestion. In the illustrated example, the spelling suggestions 206 are spelling suggestions for the original query 202 "credation." Each spelling suggestion, e.g., "creation," "crenation," or "predation," is a different word that the user may have been intending to spell when submitting "credation."

In some implementations, the user interface 200 includes executable instructions that cause the user device, in response to a user input selecting one of the spelling suggestions 206, to modify the appearance of the user interface 200 to include, in part, search results responsive to the selected spelling suggestion. These executable instructions can be part of a client-side script, e.g., JavaScript or VBScript code. Alternatively, the executable instructions can be instructions executable on the user device, e.g., user device-executable Java instructions or native device instructions executable on a native user device platform.

Once the user selects one of the spelling suggestions 206, the executable instructions can cause the user device to obtain search results for a query including the selected spelling suggestion, and to modify the user interface to remove the spelling suggestions and display search results for a query including the selected spelling suggestion in place of the search results 204. The instructions can also cause the user device to replace the original query 202 with a query that includes the selected spelling suggestion.

In other implementations, in response to the user input selecting one of the spelling suggestions 206, the user device can obtain, e.g., from the search system 114 of FIG. 1, and display a modified user interface that includes search results responsive to a query including the selected spelling suggestion but does not include the spelling suggestions.

Figure 3:
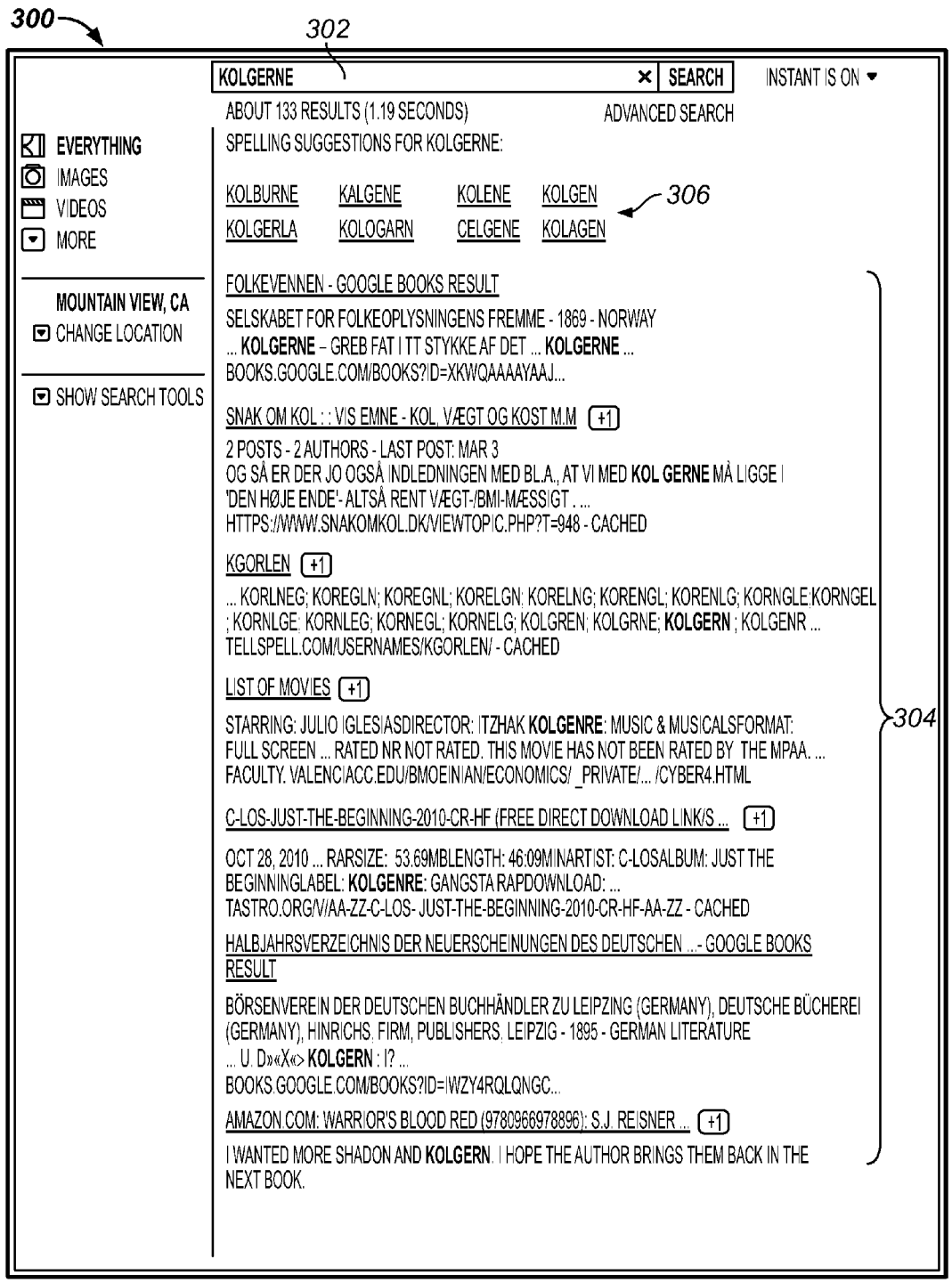
FIG. 3 illustrates another example user interface that includes search results and spelling suggestions.

FIG. 3 illustrates another example user interface 300 that includes search results 304 and spelling suggestions 306. The user interface 300 includes the original query 302, "kolgerne" in this example, and a set of search results 304 returned from a search engine, e.g., search engine 130 of FIG. 1, in response to the original query 302.

The user interface 300 also includes spelling suggestions 306 based on the original query 302. A selectable link is displayed for each spelling suggestion. In the illustrated example, the spelling suggestions 306 are spelling suggestions for the original query 302 "kolgerne." Each spelling suggestion, e.g., "kolburne," "kalgene," or "kolene," is a different word that the user may have been intending to spell when submitting "kolgerne."

In some implementations, the user interface 300 includes executable instructions that cause the user device, in response to a user input selecting one of the spelling suggestions 306, to modify the appearance of the user interface 300 to include search results responsive to a query including the selected spelling suggestion while still displaying the spelling suggestions 306.

In other implementations, in response to the user input selecting one of the spelling suggestions 206, the user device can obtain, e.g., from the search system 114 of FIG. 1, and display a modified user interface that includes search results responsive to a query including the selected spelling suggestion and the spelling suggestions 306.

Figure 4:
FIG. 4 illustrates an example modified user interface that includes search results that are each responsive to a selected spelling suggestion.

FIG. 4 illustrates an example modified user interface 400 that includes search results 404 that are each responsive to a selected spelling suggestion 402. In the illustrated example, a user has selected a spelling suggestion 402 ("kalgene"), which is one of the spelling suggestions 306 generated for an original query 410 ("kolgerne"). In some implementations, in response to user input selecting the spelling suggestion 402, executable instructions included in the user interface cause the user device to modify the user interface 300 of FIG. 3 to generate the modified user interface 400. Alternatively, the modified user interface 400 can have been obtained from a search system by the user device by activating a link associated with the selected spelling suggestion 402.

In particular, the modified user interface 400 displays search results 406 responsive to the query "kolgerne" in place of search results previously displayed in response to the original query 410. Although the search results are different, each of the spelling suggestions 306 is still displayed. This gives the user an opportunity to select another of the spelling suggestions 306 if the search results for the selected spelling suggestion 402 are not satisfactory. Additionally, the displayed original query 410 is associated with a link so that, in response to a user input selecting the displayed original query, the user device obtains, either from a local store or from the search system, and displays search results responsive to the original query.

Furthermore, the appearance of the selected spelling suggestion 402 in the modified user interface 400 has been modified to indicate that it has been selected. In this example, it has been modified by bolding the text of the displayed suggestion and changing the appearance of the suggestion to indicate that it is no longer associated with a link to other search results. The modified user interface 400 also displays the selected spelling suggestion in the input field 404 in place of the original query. This indicates that the displayed search results 406 are responsive to the selected spelling suggestion rather than to the original query.

Figure 5:
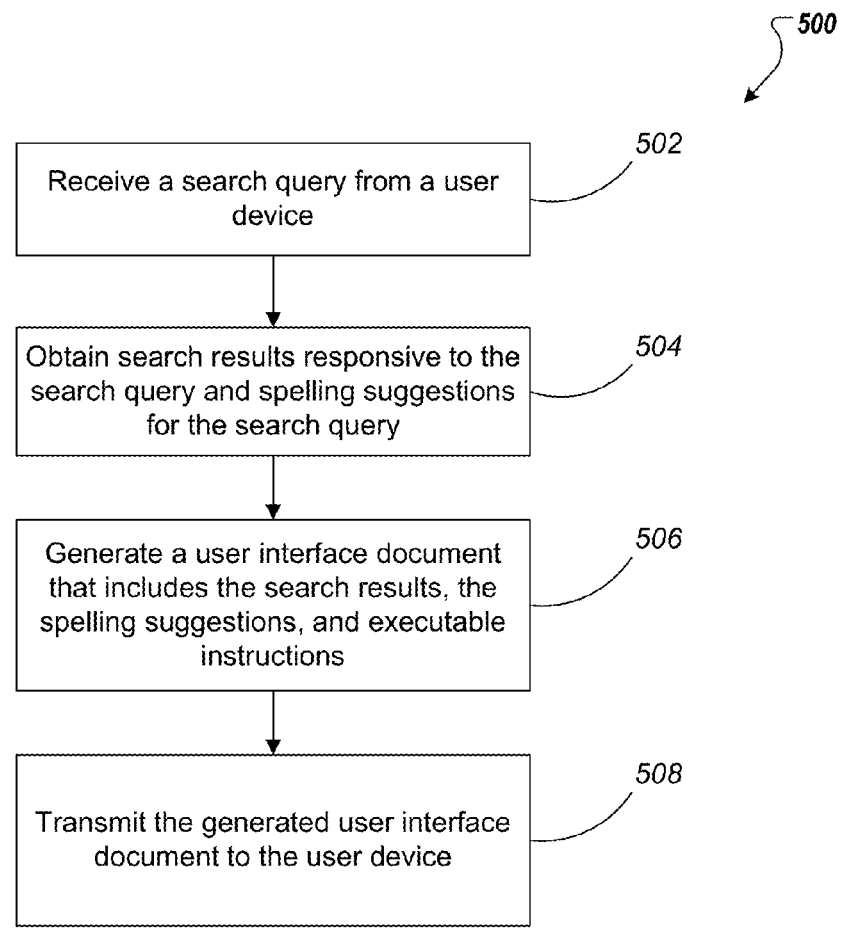
FIG. 5 is a flow chart of an example process for generating a user interface document for displaying spelling suggestions.

FIG. 5 is a flow chart of an example process 500 for generating a user interface document for displaying spelling suggestions. The process 500 can be performed by a system of one or more computers located in one or more locations. For example, a search system, e.g., search system 114 of FIG. 1, can be used to perform the process 500.

The system receives a search query from a user device (step 502). The system obtains search results responsive to the search query and spelling suggestions at least one term in the search query (step 504).

The system generates a user interface document that includes the search results, the spelling suggestions, and executable instructions (step 506). When rendered by the user device, the user interface document presents a user interface that displays the search results and the spelling suggestions. The executable instructions, when executed by the user device, cause the user device to modify the presented user interface in response to a user input selecting a displayed spelling suggestion. In some implementations, the instructions cause the user device to modify the user interface to display search results responsive to a query including the selected spelling suggestion in place of the search results responsive to the search query while continuing to display the spelling suggestions. In other implementations, the instructions cause the user device to modify the user interface to no longer display the spelling suggestions in response to the user input. The system transmits the generated user interface document to the user device (step 508).

Other implementations for modifying a user interface in response to a user selection of a spelling suggestion are possible. For example, instead of the user interface document including executable instructions that cause the user device to modify the user interface, the system can generate a new user interface document and transmit the new user interface document to the user device in response to receiving data identifying the selected spelling suggestion. The new user interface document, when rendered by the user device, can present the modified user interface as described above.

In some implementations, the user device receives and displays spelling suggestions for a search query before a user has explicitly submitted the search query to a search system.

Figure 6:
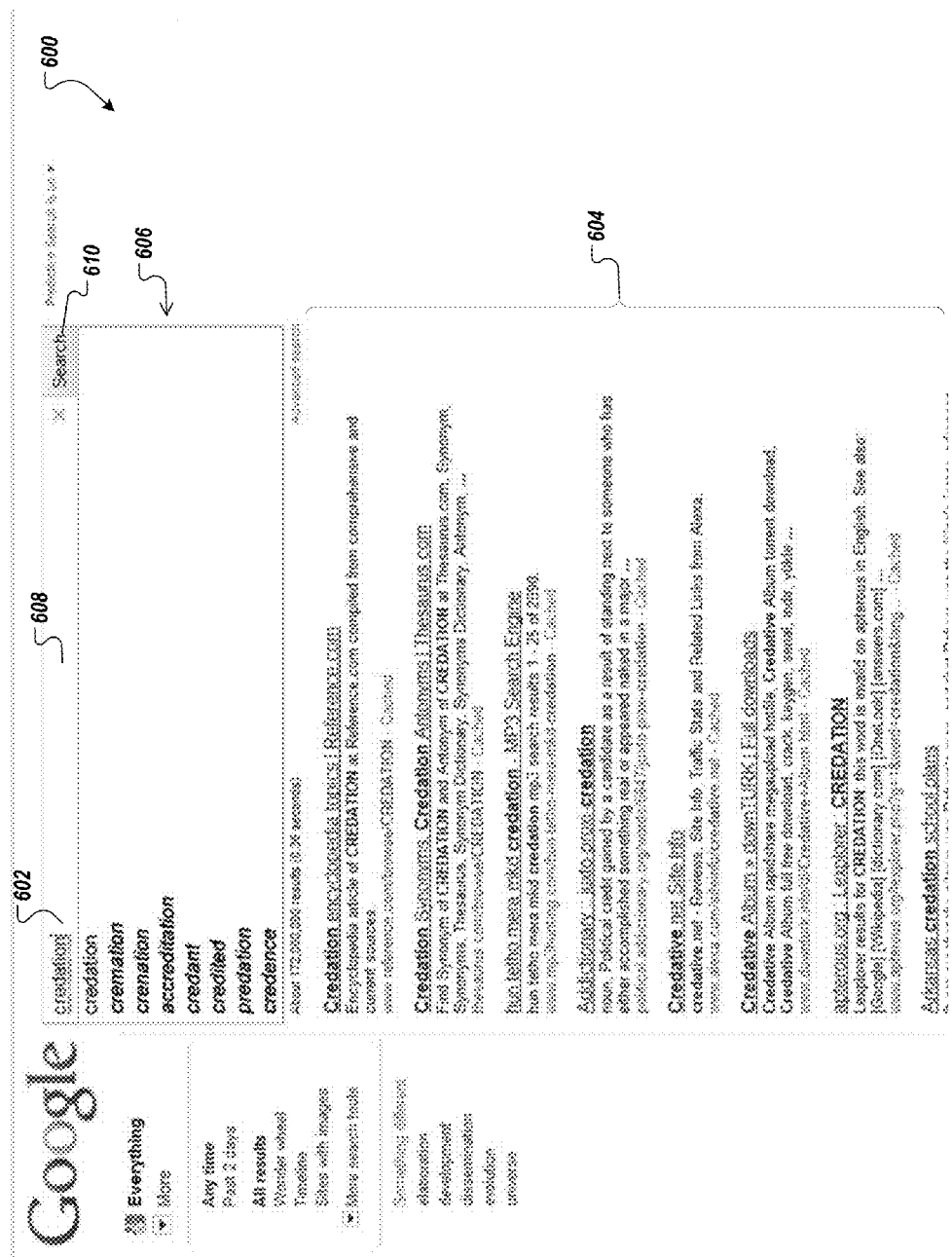
FIG. 6 illustrates an example user interface that includes spelling suggestions for a search query obtained before the search query has been submitted by a user.

FIG. 6 illustrates an example user interface 600 that includes spelling suggestions 606 for a search query 602 obtained before the search query has been submitted by a user. The user interface 600 includes executable instructions that cause the user device to detect user input in the input field 608 defining the original search query 602 ("credation") and to transmit data identifying the user input, i.e., query 602, to a search system to obtain search results for the query 602. If spelling suggestions are triggered for a query, the search system may transmit spelling suggestions for at least one term in the query to the user device along with the search results responsive to the query. The instructions can cause the user device to obtain search results, for example, at predetermined intervals, after the user has entered a specified number of characters, or after the user device has detected that no user input has been received for over a threshold period of time.

In the illustrated example, the instructions cause the user device to obtain and display the obtained search results 604 and the spelling suggestions 606 before the user has explicitly submitted the original search query 602, i.e., without receiving a user input selecting the displayed search button 610 or any other user input submitting the search query. Once the spelling suggestions 606 are obtained, they are displayed in a drop-down box below the search query 602. If a user input selecting one of the spelling suggestions is received, the instructions can cause the client device to obtain search results for a query including the spelling suggestion and to modify the user interface to present the search results for the query including the selected spelling suggestion in place of search results 604.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a tangible non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing first instructions that, when executed by the one or more computers, cause the one or more computers to perform first operations comprising:

receiving a first search query from a user device;

receiving first search results for the first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value; and generating, for transmission to the user device, a user interface document that, when rendered, presents a user interface that displays the plurality of spelling suggestions and the first search results, wherein the user interface document includes second instructions that are operable to cause the user device to perform second operations comprising:

receiving a user input selecting one of the plurality of spelling suggestions;

transmitting data identifying the selected spelling suggestion to request second search results for a second search query comprising the selected spelling suggestion from the search engine; and displaying the second search results in place of the first search results in the user interface.

2. The system of claim 1, wherein a second spelling suggestion of the plurality of spelling suggestions is an aggressive spelling suggestion that does not share a common phonetic representation with the first misspelled term.

3. The system of claim 1, wherein the specified threshold value is two operations.

4. The system of claim 1, the second operations further comprising:
modifying the displayed plurality of spelling suggestions to indicate that the selected spelling suggestion has been selected.

5. The system of claim 1, the first operations further comprising:
transmitting the user interface document to the user device.

6. The system of claim 1, the first operations further comprising:
receiving data identifying the selected spelling suggestion; and
providing the second search results for the second search query comprising the selected spelling suggestion to the user device.

7. The system of claim 1, wherein the second instructions are instructions in a client-side scripting language, Java instructions, or native user device instructions executable on a native user device platform.

8. The system of claim 1, the second operations further comprising:
displaying the selected spelling suggestion in an input field in the user interface.

9. A system comprising one or more computers and one or more storage devices storing instructions that, when executed by the one or more computers, cause the one or more computers to perform operations comprising:
receiving a first search query from a user device;
receiving first search results for the first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value;
generating, for transmission to the user device, a first user interface document that, when rendered, presents a first user interface that displays the plurality of spelling suggestions and the first search results;
receiving data identifying a selected spelling suggestion; and
generating, for transmission to the user device, a second user interface document that, when rendered, presents a second user interface that displays second search results provided by the search engine for a second search query comprising the selected spelling suggestion in place of the first search results.

10. The system of claim 9, wherein a second spelling suggestion of the plurality of spelling suggestions is an aggressive spelling suggestion that does not share a common phonetic representation with the first misspelled term.

11. The system of claim 9, wherein the specified threshold value is two operations.

12. The system of claim 9, wherein the second user interface, when rendered, modifies the appearance of the displayed plurality of spelling suggestions to indicate that the selected spelling suggestion has been selected.

13. The system of claim 9, wherein the second user interface further displays the selected spelling suggestion in an input field.

14. A system comprising one or more computers and one or more storage devices storing first instructions that when executed by the one or more computers cause the one or more computers to perform first operations comprising:
generating, for transmission to a user device, a user interface document that, when rendered, presents a user interface that includes an input field, wherein the user interface document includes second instructions that are operable to cause the user device to perform second operations comprising:
detecting a first search query entered in the input field by a user;
before the first search query is explicitly submitted by the user, obtaining first search results for the first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value; and
displaying the first search results and the plurality of spelling suggestions in the user interface.

15. The system of claim 14, wherein a second spelling suggestion of the plurality of spelling suggestions is an aggressive spelling suggestion that does not share a common phonetic representation with the first misspelled term.

16. The system of claim 14, wherein the specified threshold value is two operations.

17. The system of claim 14, the first operations further comprising:
transmitting the user interface document to the user device.

18. The system of claim 14, the second operations further comprising:
receiving a user input selecting one of the plurality of spelling suggestions;
transmitting data identifying the selected spelling suggestion to request second search results for a second search query comprising the selected spelling suggestion from the search engine; and
displaying the second search results in place of the first search results in the user interface.

19. The system of claim 18, the first operations further comprising:
receiving data identifying a selected spelling suggestion; and
providing the second search results for the second search query comprising the selected spelling suggestion to the user device.

20. The system of claim 18, the second operations further comprising:
displaying the selected spelling suggestion in place of the first search query in the input field.

21. A computer storage medium encoded with a computer program, the program comprising instructions that when executed by one or more computers cause the one or more computers to perform operations comprising:
receiving first search results for a first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value;

displaying the plurality of spelling suggestions and the first search results in a user interface;

receiving a user input selecting one of the plurality of spelling suggestions;

transmitting data identifying the selected spelling suggestion to request second search results for a second search query comprising the selected spelling suggestion from the search engine; and displaying the second search results in place of the first search results in the user interface.

22. The computer storage medium of claim 21, wherein a second spelling suggestion of the plurality of spelling suggestions is an aggressive spelling suggestion that does not share a common phonetic representation with the first misspelled term.

23. The computer storage medium of claim 21, wherein the specified threshold value is two operations.

24. The computer storage medium of claim 21, the operations further comprising:
modifying the displayed plurality of spelling suggestions to indicate that the selected spelling suggestion has been selected.

25. The computer storage medium of claim 21, the operations further comprising:
displaying the selected spelling suggestion in an input field in the user interface.

26. A computer storage medium encoded with a computer program, the program comprising instructions that when executed by one or more computers cause the one or more computers to perform operations comprising:
presenting a user interface that includes an input field;
detecting a first search query entered in the input field by a user;
before the first search query is explicitly submitted by the user, obtaining first search results for the first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value; and
displaying the first search results and the plurality of spelling suggestions in the user interface.

27. The computer storage medium of claim 26, wherein a second spelling suggestion of the plurality of spelling suggestions is an aggressive spelling suggestion that does not share a common phonetic representation with the first misspelled term.

28. The computer storage medium of claim 26, wherein the specified threshold value is two operations.

29. The computer storage medium of claim 26, the operations further comprising:
receiving a user input selecting one of the plurality of spelling suggestions;
transmitting data identifying the selected spelling suggestion to request second search results for a second search query comprising the selected spelling suggestion from the search engine; and
displaying the second search results in place of the first search results in the user interface.

30. The computer storage medium of claim 26, the operations further comprising:
displaying the selected spelling suggestion in place of the first search query in the input field.

31. A method performed by one or more computers, the method comprising:
receiving a first search query from a user device;
receiving first search results for the first search query and a plurality of spelling suggestions for a first misspelled term in the first search query, wherein the first search results are provided by a search engine as a response to the first search query, and wherein a first spelling suggestion of the plurality of spelling suggestions is an aggressive spelling suggestion having an edit distance between the first misspelled term and the first spelling suggestion that is greater than a specified threshold value; and
generating, for transmission to the user device, a user interface document that, when rendered, presents a user interface that displays the plurality of spelling suggestions and the first search results, wherein the user interface document includes instructions that are operable to cause the user device to perform operations comprising:
receiving a user input selecting one of the plurality of spelling suggestions;
transmitting data identifying the selected spelling suggestion to request second search results for a second search query comprising the selected spelling suggestion from the search engine; and
displaying the second search results in place of the first search results in the user interface.

32. The method of claim 31, wherein a second spelling suggestion of the plurality of spelling suggestions is an aggressive spelling suggestion that does not share a common phonetic representation with the first misspelled term.

33. The method of claim 31, wherein the specified threshold value is two operations.

34. The method of claim 31, further comprising:
modifying the displayed plurality of spelling suggestions to indicate that the selected spelling suggestion has been selected.

35. The method of claim 31, further comprising:
transmitting the user interface document to the user device.

36. The method of claim 31, further comprising:
receiving data identifying the selected spelling suggestion; and
providing the second search results for the second search query comprising the selected spelling suggestion to the user device.

37. The method of claim 31, wherein the instructions are instructions in a client-side scripting language, Java instructions, or native user device instructions executable on a native user device platform.

38. The method of claim 31, further comprising:
displaying the selected spelling suggestion in an input field in the user interface.

* * * * *